United States Patent
Bikumala et al.

(10) Patent No.: US 10,715,640 B2
(45) Date of Patent: Jul. 14, 2020

(54) INTERNET OF THINGS GATEWAYS OF MOVING NETWORKS

(71) Applicant: EMC IP Holding Company LLC, Hopkinton, MA (US)

(72) Inventors: Sathish Kumar Bikumala, Round Rock, TX (US); Karunanithi Shanmugam, Frisco, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 55 days.

(21) Appl. No.: 16/034,427

(22) Filed: Jul. 13, 2018

(65) Prior Publication Data

US 2020/0021669 A1    Jan. 16, 2020

(51) Int. Cl.
*H04L 29/06* (2006.01)
*H04L 29/08* (2006.01)
*H04W 4/70* (2018.01)
*H04L 12/66* (2006.01)

(52) U.S. Cl.
CPC .............. *H04L 69/08* (2013.01); *H04L 12/66* (2013.01); *H04L 67/12* (2013.01); *H04L 67/18* (2013.01); *H04W 4/70* (2018.02)

(58) Field of Classification Search
CPC ......... H04L 69/08; H04L 12/66; H04L 67/12; H04L 67/18; H04W 4/70
See application file for complete search history.

(56) References Cited

U.S. PATENT DOCUMENTS

| | | | |
|---|---|---|---|
| 8,428,514 B2* | 4/2013 | Wu | H04W 52/0216 455/41.2 |
| 10,082,562 B1* | 9/2018 | Abari | G01S 7/35 |
| 10,425,194 B2* | 9/2019 | Wang | H04W 40/22 |
| 10,440,096 B2* | 10/2019 | Sabella | G06F 9/5027 |
| 2015/0016359 A1* | 1/2015 | Wang | H04W 74/04 370/329 |
| 2015/0288636 A1* | 10/2015 | Yalavarty | H04L 51/16 709/206 |
| 2016/0019294 A1* | 1/2016 | Dong | H04W 4/70 707/794 |

(Continued)

OTHER PUBLICATIONS

U.S. Appl. No. 15/965,022 entitled, "Internet of Things Gateway for a Cloud Foundry Platform" filed Apr. 27, 2018.

*Primary Examiner* — Blake J Rubin
(74) *Attorney, Agent, or Firm* — Ryan, Mason & Lewis, LLP (57) ABSTRACT

A method in one embodiment comprises: obtaining, by a first cloud-based IoT gateway service, a radio signal from a first mobile sensor device; converting the radio signal to a message in a machine-to-machine IoT connectivity protocol; and providing the message to a message broker that determines a topic of the message and publishes the message using the topic. The message is distributed to one or more additional mobile sensor devices using a content delivery network. The first mobile sensor device optionally obtains the radio signal from one or more additional mobile sensor devices by means of vehicle-to-vehicle communications. The radio signal comprises, for example, a distress signal of a given mobile sensor device and a K-Nearest Neighbor process is optionally used to identify other mobile devices in proximity to the given mobile sensor device.

20 Claims, 6 Drawing Sheets

(56) References Cited

U.S. PATENT DOCUMENTS

| | | | |
|---|---|---|---|
| 2016/0329965 A1* | 11/2016 | Cook | H04L 67/02 |
| 2016/0337206 A1* | 11/2016 | Bugenhagen | G06F 3/0486 |
| 2016/0344841 A1* | 11/2016 | Wang | H04L 67/12 |
| 2017/0180380 A1* | 6/2017 | Bagasra | H04L 63/101 |
| 2017/0310767 A1* | 10/2017 | Flynn, IV | H04W 4/70 |
| 2017/0359443 A1* | 12/2017 | Wei | G06F 9/46 |
| 2018/0011694 A1* | 1/2018 | Al-Fuqaha | H04L 67/12 |
| 2018/0040172 A1* | 2/2018 | Funk | G06F 21/566 |
| 2018/0054799 A1* | 2/2018 | Starsinic | H04W 52/0219 |
| 2018/0063250 A1* | 3/2018 | Justin | G06F 11/261 |
| 2018/0146041 A1* | 5/2018 | Moustafa | H04L 67/16 |
| 2018/0159815 A1* | 6/2018 | Halley | H04L 61/1511 |
| 2018/0181095 A1* | 6/2018 | Funk | G05B 19/042 |
| 2018/0285580 A1* | 10/2018 | Chen | G06F 21/6218 |
| 2018/0302751 A1* | 10/2018 | Coutinho | H04W 4/023 |
| 2018/0316555 A1* | 11/2018 | Salgueiro | H04L 41/0853 |
| 2018/0351808 A1* | 12/2018 | Das | H04L 43/08 |
| 2019/0007513 A1* | 1/2019 | Flynn, IV | H04L 67/2823 |
| 2019/0061771 A1* | 2/2019 | Bier | G06N 3/08 |
| 2019/0104458 A1* | 4/2019 | Svennebring | H04W 76/27 |
| 2019/0137622 A1* | 5/2019 | Lopez-Hinojosa | G01S 13/865 |
| 2019/0150074 A1* | 5/2019 | Narayanan | H04W 48/18 455/434 |
| 2019/0166223 A1* | 5/2019 | Zhu | G06F 9/445 |
| 2019/0182895 A1* | 6/2019 | Di Girolamo | H04W 36/0033 |
| 2019/0197497 A1* | 6/2019 | Abari | G06Q 10/20 |
| 2019/0209022 A1* | 7/2019 | Sobol | A61B 5/0002 |
| 2019/0222652 A1* | 7/2019 | Graefe | H04Q 9/00 |
| 2019/0250622 A1* | 8/2019 | Nister | B60R 1/00 |
| 2019/0319868 A1* | 10/2019 | Svennebring | H04L 43/0882 |
| 2019/0324450 A1* | 10/2019 | Lurie | H04L 9/14 |
| 2019/0349848 A1* | 11/2019 | Bali | H04L 67/12 |
| 2020/0014762 A1* | 1/2020 | Li | H04L 67/141 |

\* cited by examiner

INTERNET OF THINGS GATEWAYS OF MOVING NETWORKS

FIELD

The field relates generally to communication techniques among sensor devices.

BACKGROUND

The Internet of Things (IoT) is a network of distributed physical devices, such as vehicles and sensors, that exchange data over the network. With the proliferation of IoT networks, sensor data comprises information regarding a number of diverse physical variables. Such information is useful for a wide range of applications, such as surveillance and other law enforcement applications, medical monitoring, transportation monitoring, habitat monitoring, factory control, and pipeline integrity.

As society grows increasingly dependent on such sensor data, the proper management and processing of the gathered sensor data also becomes important. It has been estimated, for example, that the amount of sensor data generated and transferred by vehicle sensors significantly exceeds the amount of available bandwidth, including the bandwidth available using vehicle-to-vehicle and other communication routing mechanisms.

A need exists for improved techniques for communicating data in a multi-sensor IoT environment.

SUMMARY

Illustrative embodiments of the present disclosure provide methods, apparatus and computer program products for communicating data among mobile sensor devices using IoT gateway services. In one embodiment, an exemplary method comprises: obtaining, by a first cloud-based IoT gateway service, a radio signal from a first mobile sensor device; converting the radio signal to a message in a machine-to-machine IoT connectivity protocol; and providing the message to a message broker of the first cloud-based IoT gateway service that determines a topic of the message and publishes the message using the topic, wherein the message is published to an origin server of a content delivery network, and wherein the message is consumed from at least one edge server of the content delivery network and published to a second cloud-based IoT gateway service, wherein the second cloud-based IoT gateway service publishes the message as a radio signal using the topic to at least one additional mobile sensor device within a range of the second cloud-based IoT gateway service for receiving radio signals. The first mobile sensor device optionally obtains the radio signal from one or more additional mobile sensor devices by means of vehicle-to-vehicle communications.

In some embodiments, the radio signal comprises a distress signal of a given mobile sensor device and a location of the given mobile sensor device. A K-Nearest Neighbor process is optionally employed to identify other mobile devices in proximity to the given mobile sensor device.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. Accordingly, the term "sensor" as used herein is intended to be broadly construed, so as to encompass, for example, sensors designed specifically for a specific purpose, such as thermometers, cameras and smoke detectors, as well as general-purpose devices, such as smartphones and tablets that perform a sensing function.

One or more embodiments of the disclosure provide methods, apparatus and computer program products for communicating data among mobile sensor devices using IoT gateway services. In this manner, sensor data, for example, from a vehicle, such as a truck, may be communicated using an IoT gateway service without using cellular and/or satellite networks, as done with conventional sensor communication techniques.

In some embodiments, an IoT gateway moving network is provided that employs multiple IoT gateway services and a content delivery network to distribute data between the multiple IoT gateway services. An exemplary IoT gateway service obtains a wireless communication, transmitted, for example, using a Bluetooth standard, from a mobile sensor device, converts the wireless communication to a machine-to-machine IoT connectivity protocol, such as a Message Queuing Telemetry Transport (MQTT) protocol; and provides the converted wireless communication as a message to a message broker of a gateway service that determines a topic of the message and publishes the message using the topic. The message is published to the content delivery network and a publisher/subscriber service optionally consumes the message from an edge server of the content delivery network and publishes the message to one or more additional gateway services, which publishes the message as a radio signal to additional mobile device(s) that are within range of a given gateway service.

In one or more embodiments, one or more components of the disclosed IoT gateway moving networks are implemented using one or more open source technologies that allow the components to be configurable and/or vendor neutral.

In at least one embodiment, the disclosed IoT gateway service can be implemented using the techniques described in U.S. patent application Ser. No. 15/965,022, entitled "Internet of Things Gateway for a Cloud Foundry Platform," incorporated by reference herein in its entirety.

Figure 1:
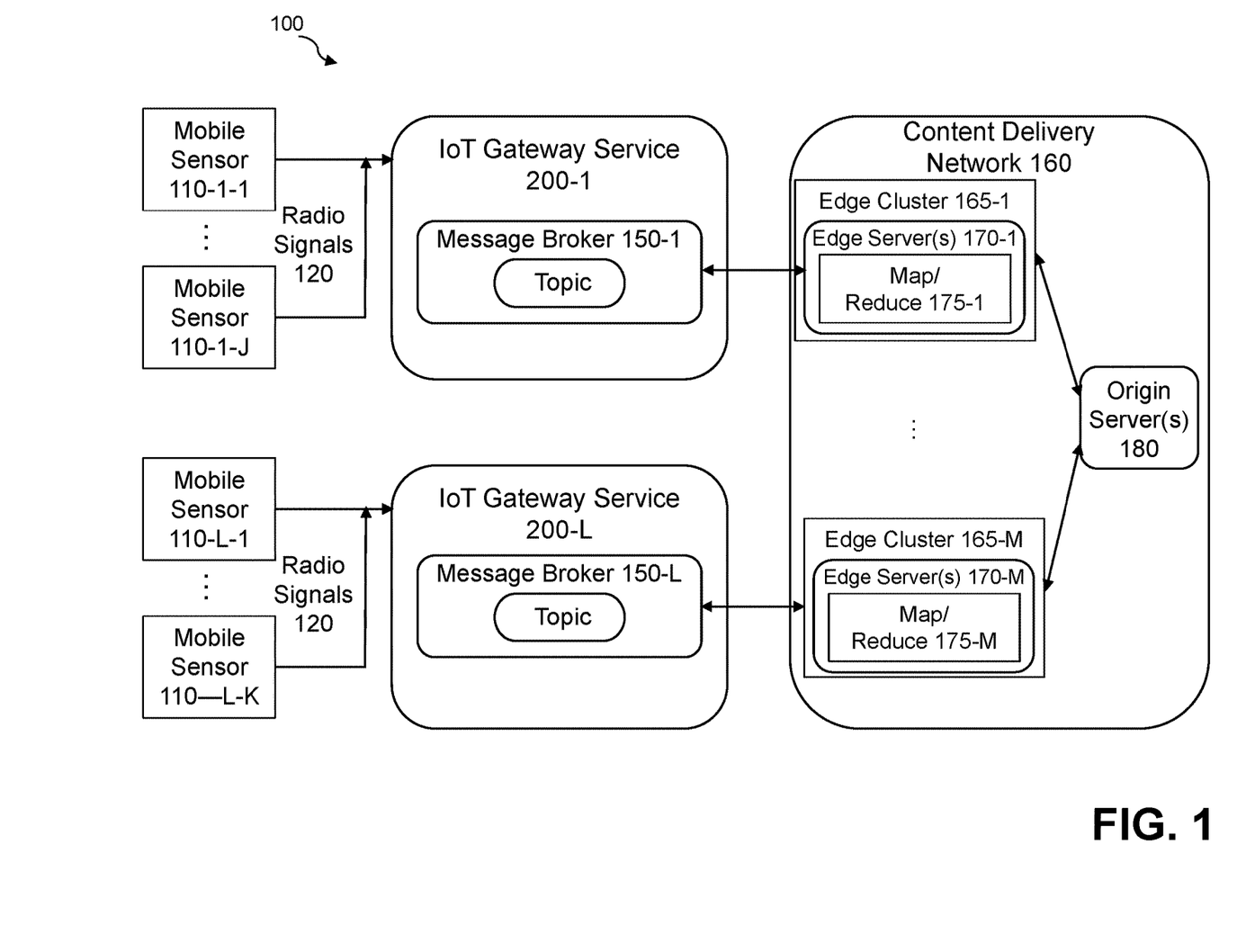
FIG. 1 illustrates an IoT gateway moving network configured in accordance with an illustrative embodiment.

FIG. 1 illustrates an exemplary IoT gateway moving network 100 configured in accordance with an illustrative embodiment. As shown in FIG. 1, the exemplary IoT gateway moving network 100 comprises one or more IoT gateway services 200-1 through 200-L, as discussed further below in conjunction with FIG. 2, that communicate with a content delivery network 160.

The exemplary IoT gateway services 200-1, 200-L receive sensor data over radio signals 120 from a plurality of mobile sensors 110-1-1 through 110-1-J and 110-L-1 through 110-L-K, respectively, as discussed further below in conjunction with FIG. 2. It is noted that the radio signals received by an exemplary IoT Gateway service 200 from a particular sensor, such as mobile sensor 110-1-1, may have been received by the mobile sensor 110-1-1 from one or more additional sensors (not shown in FIG. 1), communicated, for example, using vehicle-to-vehicle communications. In this manner, the vehicles (e.g., cars or trucks) on the road can transmit the sensor data to a data center by connecting to each other and pushing the sensor data over one or more exemplary IoT Gateway services 200. Each vehicle can have a mobile client (MC) installed, for example, as a smart phone application which can interact with one or more IoT Gateway services 200. The vehicle-to-vehicle communications can be initiated between two or more vehicles or sensors, for example, when the vehicles have a distance that satisfies a predefined distance criteria. The exemplary IoT gateway services 200-1, 200-L comprise message brokers 150-1 and 150-L, respectively, that receive and publish messages based on one or more predefined topics.

The exemplary content delivery network 160 comprises a plurality of edge clusters 165-1 through 165-M and one or more origin servers 180, in a known manner. In the exemplary embodiment of FIG. 1, the edge clusters 165 each comprise one or more edge servers 170-1 through 170-M and each edge server 170 optionally includes a map/reduce function 175-1 through 175-M. The map/reduce functions 175 optionally execute a K-nearest neighbor (KNN) process, as discussed hereinafter.

The topic in an IoT Gateway Service 200 can be subscribed to by a publisher/subscriber service that consumes the messages published by IoT Gateway Service and publishes the messages on the origin server 180. A publisher/subscriber service deployed in different regions on the cloud can consume this message through the respective edge server 170 of the content delivery network 160 and publishes the message to an IoT Gateway service, for example, in a different cloud region, where another vehicle can consume the messages that are published.

Figure 2:
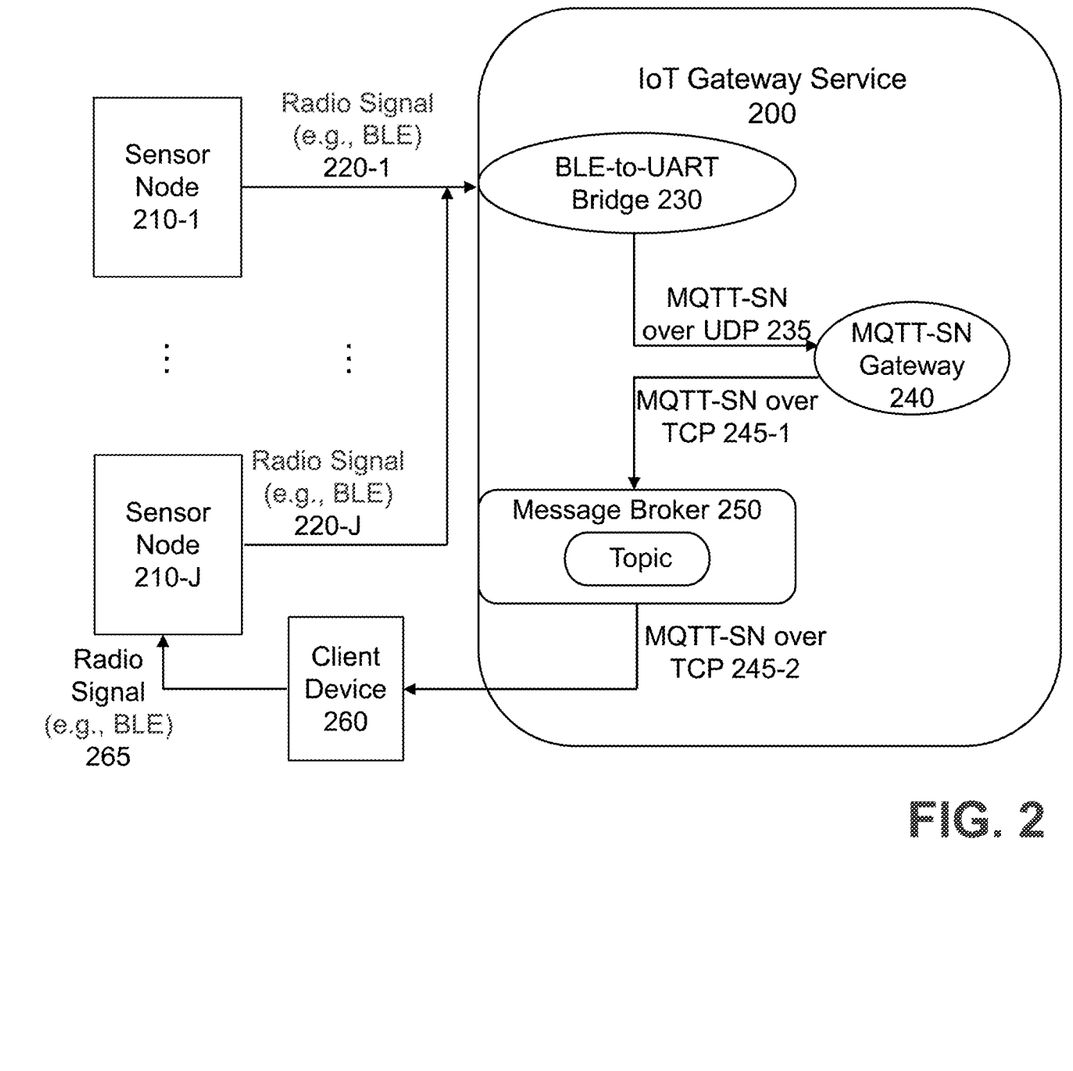
FIG. 2 illustrates an exemplary IoT gateway service, according to some embodiments.

FIG. 2 illustrates an exemplary IoT gateway service 200 of FIG. 1, according to some embodiments. As shown in FIG. 2, the exemplary IoT gateway service 200 receives radio signals 220-1 through 220-J (collectively, radio signals 220), such as a Bluetooth Low Energy (BLE) protocol, from one or more sensor nodes 210-1 through 210-J.

As shown in FIG. 2, the radio signals 220 are processed in the exemplary IoT gateway service 200 by a BLE-to-UART (Universal Asynchronous Receiver-Transmitter) bridge 230 that converts the radio signals 220 into an MQTT format, such as MQTT-SN (sensor network) messages over UDP (User Datagram Protocol) 235. The MQTT-SN over UDP messages 235 are processed by an MQTT-SN gateway 240 that converts the MQTT-SN over UDP messages 235 to MQTT-SN over TCP (Transmission Control Protocol) messages 245-1 and provides the MQTT-SN over TCP messages 245-1 to a message broker 250.

In some embodiments, the message broker 250 is implemented as an MQTT message broker, such as a Really Small Message Broker (RSMB). The message broker 250 determines a topic of a given message 245-1 and publishes the given message 245-1 to one or more client devices 260 that have subscribed to the particular topic as MQTT-SN over TCP messages 245-2. The exemplary message broker 250 optionally also provides authorization and/or access control for the message, for example, using an authorization mechanism such as Lightweight Directory Access Protocol (LDAP)/AD (Active Directory).

The message broker 250 optionally stores the messages according to various topics and the topics can be subscribed by different client devices 260.

The exemplary client device 260 can optionally provide a radio signal 265, for example, in a BLE format to one or more of the sensor nodes 210-1 through 210-J. The radio signal 265 may be based, for example, on the topic of the message. In this manner, the reactive stream of data/signal can be sent by the exemplary client device 260 that can be sent back to the sensor nodes 210 by the client devices 260 (listeners of these topics) which, in turn, can be converted as BLE radio signals 265 and sent to the sensor node 210 of the IoT devices.

In at least one embodiment, the client device(s) 260 are implemented as message listener processes that act as a subscriber to various topics of interest provided by the message broker 250. Thus, the client device(s) 260 subscribes to the specified topics. When a message 245-1 has been sent by the MQTT-SN gateway 240, the message broker 250 receives the message 245-1 and optionally decides if the topic of the message 245-1 is valid. Once the topic has been verified, if needed, the message broker 250 publishes the message using the respective topic, for example, in an event source (not shown) or directly to the client device(s) 260. In some embodiments, the message broker 250 and client device(s) 260 are implemented using open source technology, and optionally employ the same open source technology, such as a RabbitMQ® open source message broker. In this manner, the message broker 250 can publish the message to the client devices 260 in a vendor neutral format.

Figure 3:
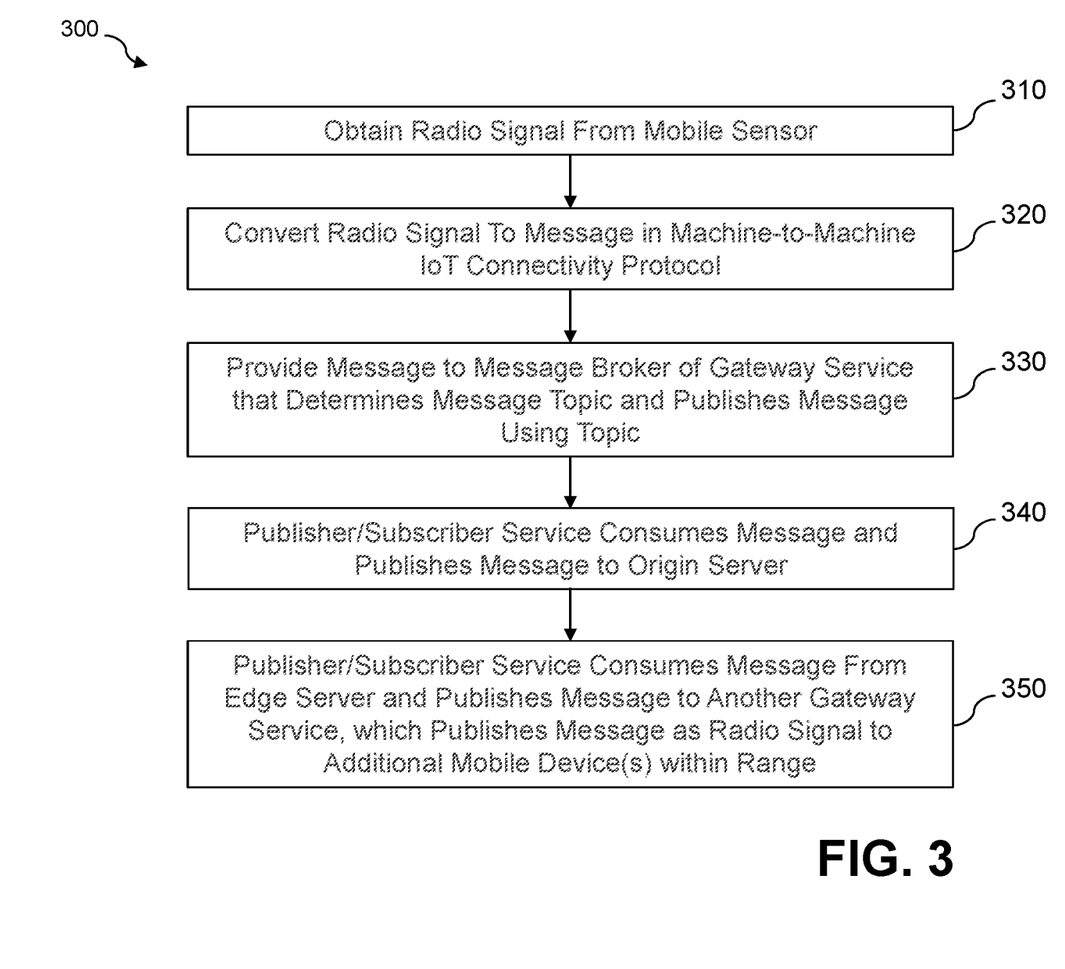
FIG. 3 is a flow chart illustrating an exemplary implementation of an IoT gateway moving network process, according to one embodiment of the disclosure.

FIG. 3 is a flow chart illustrating an exemplary implementation of an IoT gateway moving network process 300, according to one embodiment of the disclosure. As shown in FIG. 3, with reference to FIG. 1, the exemplary IoT gateway moving network process 300 initially obtains a radio signal 120, for example, by a first exemplary IoT Gateway service 200-L, from a first mobile sensor 110-L-K during step 310. For example, the first mobile sensor 110-L-K can send information to the nearest IoT Gateway service 200 to a topic, such as "trucks on the move."

The first exemplary IoT Gateway service 200 then converts the radio signal to a message during step 320 in machine-to-machine IoT connectivity protocol, such as a Message Queuing Telemetry Transport (MQTT) protocol, and provides the message to a message broker 250 of the exemplary IoT Gateway service 200 during step 330. The message broker 250 determines a topic of the message and publishes the message under the particular topic.

A publisher/subscriber service consumes the message during step 340 and publishes the message to the origin server 180 of the content delivery network 160. A publisher/subscriber service (potentially different than the publisher/subscriber service of step 340) then consumes the message from an edge server 170 during step 350 and publishes the message to another exemplary IoT Gateway service 200, which publishes the message as a radio signal to the additional mobile device(s) within range of the additional exemplary IoT Gateway service 200. The data is optionally split into multiple packets, with each packet potentially hopping over different vehicles using vehicle-to-vehicle communications, in a similar manner as a dynamic mesh network of connected devices.

Figure 4:
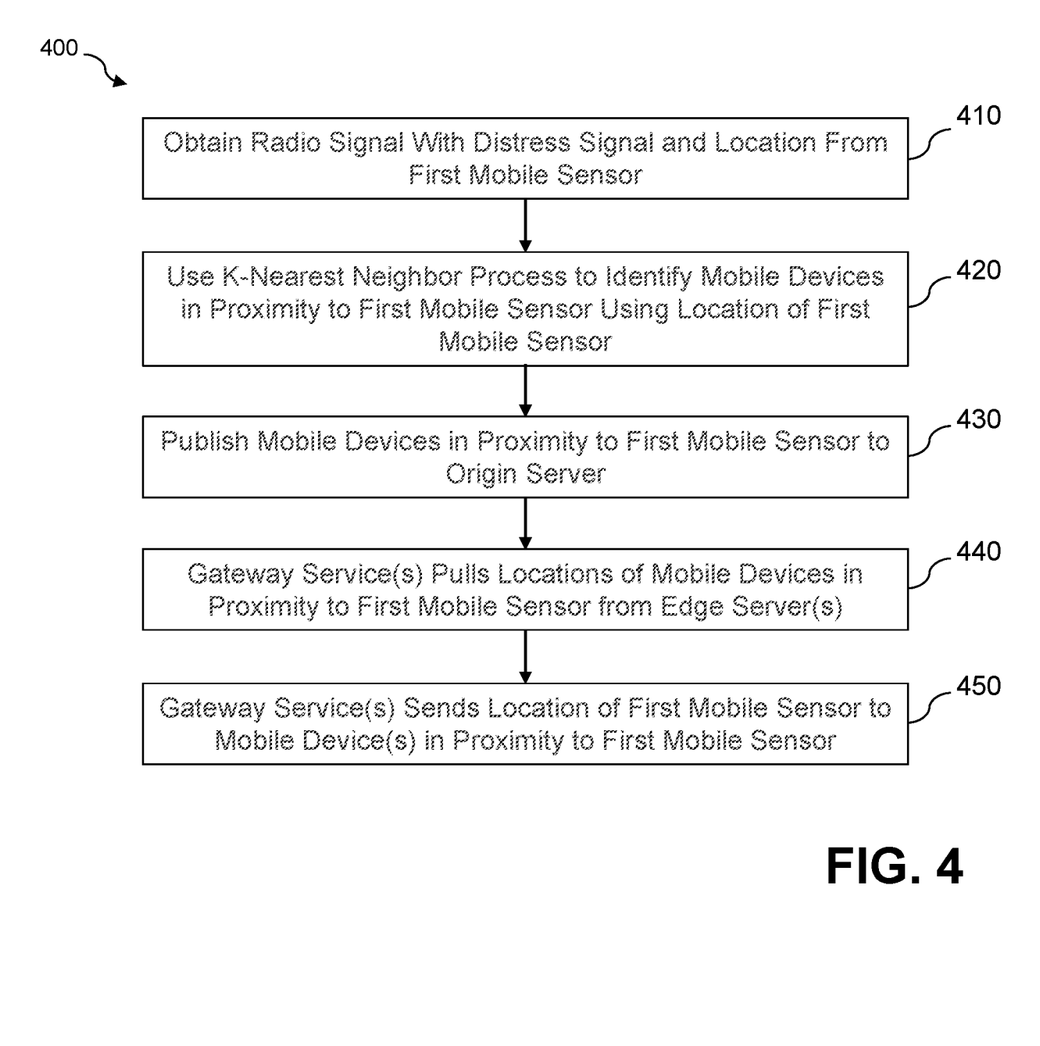
FIG. 4 is a flow chart illustrating an exemplary implementation of an IoT gateway moving network vehicle distress process, according to an embodiment.

FIG. 4 is a flow chart illustrating an exemplary implementation of an IoT gateway moving network vehicle distress process 400, according to an embodiment. As shown in FIG. 4, with reference to FIG. 1, the exemplary IoT gateway moving network vehicle distress process 400 initially obtains a radio signal 120 during step 410 with a distress signal and location (e.g., latitude and longitude) from a first mobile sensor 110-L-K. A K-nearest neighbor process is used during step 420 to identify one or more mobile devices that are in proximity to the first mobile sensor 110-L-K, using the location of the first mobile sensor that was included with the distress signal. For example, a Euclidean distance measure can be used during step 420 to identify the nearby mobile devices.

The exemplary IoT gateway moving network vehicle distress process 400 publishes the identified mobile devices that are in proximity to the first mobile sensor to the origin server 180 during step 430. One or more IoT gateway service(s) 200 pulls the location of the one or more identified mobile devices that are in proximity to the first mobile sensor 110-L-K from the edge server(s) 170 of the content delivery network 160 during step 440.

Finally, one or more of the IoT gateway service(s) 200 sends the location of the first mobile sensor 110-L-K to the identified mobile device(s) that are in proximity to the first mobile sensor during step 450. In this manner, one or more of the identified mobile device(s) that are in proximity to the first mobile sensor 110-L-K can provide assistance to the first mobile sensor.

Thus, in one or more embodiments, the disclosed techniques for providing IoT gateway moving networks employ open source technologies that allow one or more system components to be configurable and/or vendor neutral.

One or more embodiments of the disclosure provide improved methods, apparatus and computer program products for providing IoT gateways of moving networks. The foregoing applications and associated embodiments should be considered as illustrative only, and numerous other embodiments can be configured using the techniques disclosed herein, in a wide variety of different applications.

It should also be understood that the disclosed IoT gateways moving network techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for providing IoT gateways of moving networks may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, computer services can be offered to cloud infrastructure tenants or other system users as a Platform as a Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based IoT gateway service engine 200, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based IoT gateway service platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. These platforms may also be used to implement at least portions of other information processing systems in other embodiments.

Figure 5:
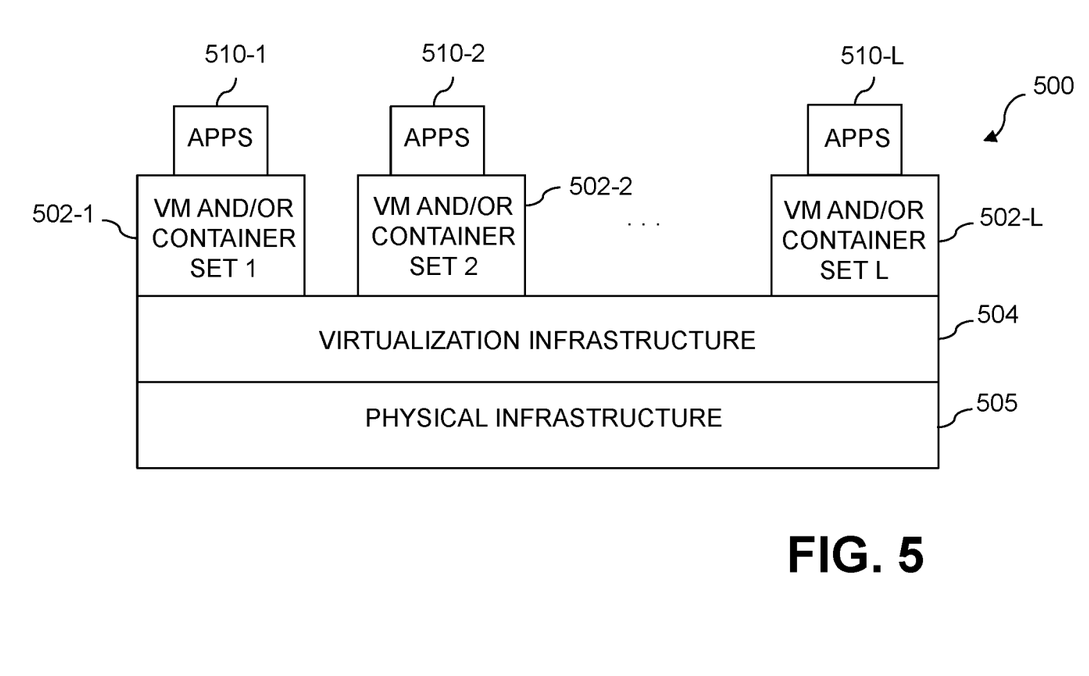
FIG. 5 illustrates an exemplary processing platform that may be used to implement at least a portion of one or more embodiments of the disclosure comprising a cloud infrastructure.

FIG. 5 shows an example processing platform comprising cloud infrastructure 500. The cloud infrastructure 500 comprises a combination of physical and virtual processing resources that may be utilized to implement at least a portion of an IoT gateway service 200. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide an IoT gateway moving network functionality of the type described above for one or more processes running on a given one of the VMs. For example, each of the VMs can implement IoT gateway moving network control logic and associated IoT gateway moving network functionality for one or more processes running on that particular VM.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can provide IoT gateway moving network functionality of the type described above for one or more processes running on different ones of the containers. For example, a container host device supporting multiple containers of one or more container sets can implement one or more instances of IoT gateway moving network control logic.

As is apparent from the above, one or more of the processing modules or other components of IoT gateway service 200 may each run on a computer, server, storage device or other processing platform element. A given such element may be viewed as an example of what is more generally referred to herein as a "processing device." The cloud infrastructure 500 shown in FIG. 5 may represent at least a portion of one processing platform.

Figure 6:
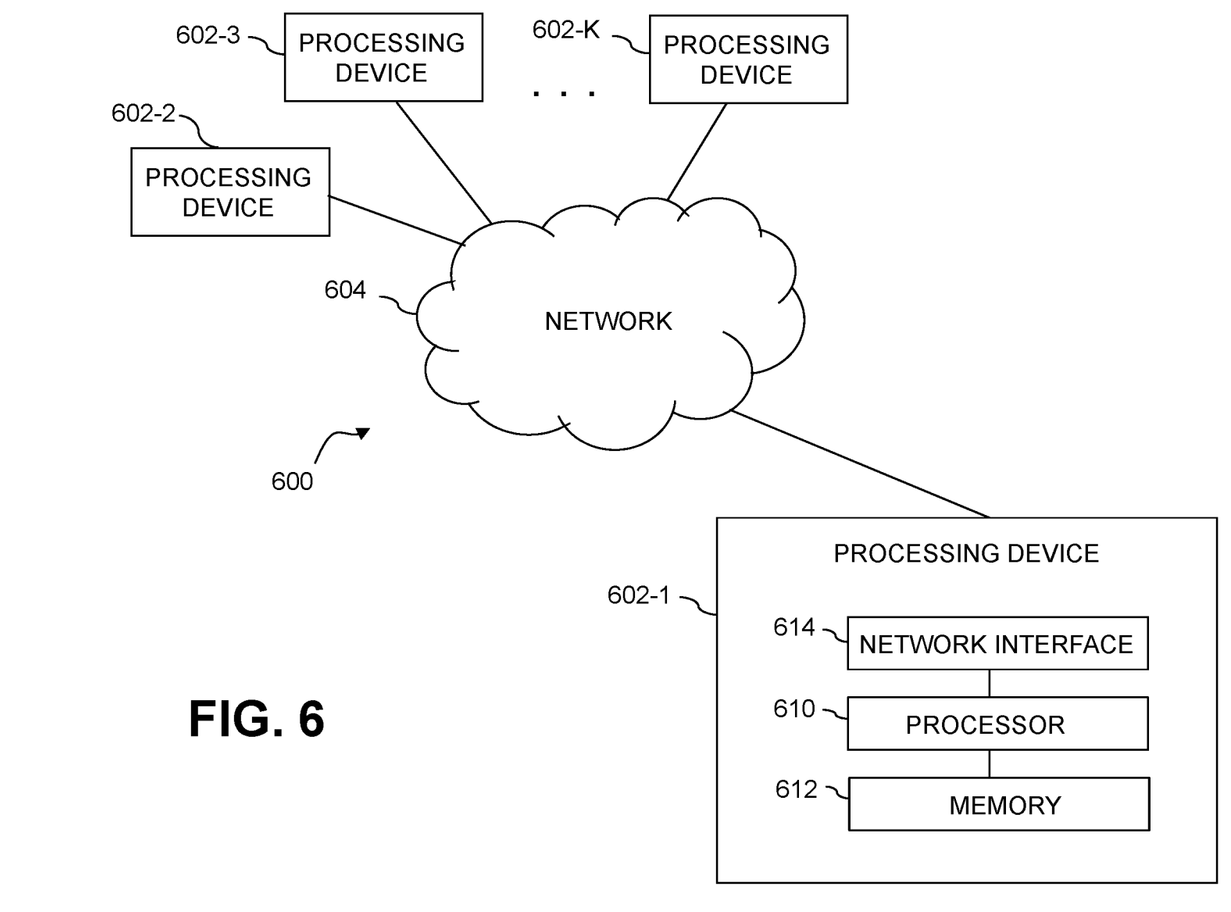
FIG. 6 illustrates another exemplary processing platform that may be used to implement at least a portion of one or more embodiments of the disclosure.

Another example of a processing platform is processing platform 600 shown in FIG. 6. The processing platform 600 in this embodiment comprises at least a portion of the given system and includes a plurality of processing devices, denoted 602-1, 602-2, 602-3, . . . 602-K, which communicate with one another over a network 604. The network 604 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 602-1 in the processing platform 600 comprises a processor 610 coupled to a memory 612. The processor 610 may comprise a microprocessor, a microcontroller, an application specific integrated circuit (ASIC), a field programmable gate array (FPGA) or other type of processing circuitry, as well as portions or combinations of such circuitry elements, and the memory 612, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM (random-access memory), ROM (read-only memory) or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and the given system may include additional or alternative processing platforms, as well as numerous distinct processing platforms in any combination, with each such platform comprising one or more computers, storage devices or other processing devices.

Multiple elements of system 100 may be collectively implemented on a common processing platform of the type shown in FIG. 5 or 6, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   obtaining, by a first cloud-based IoT gateway service of an IoT gateway moving network, a radio signal from a first mobile sensor device, wherein the IoT gateway moving network comprises a plurality of cloud-based IoT gateway services that communicate with a content delivery network;
   converting, using at least one processing device, the radio signal to a message in a machine-to-machine IoT connectivity protocol; and
   providing, using the at least one processing device, the message to a message broker of the first cloud-based IoT gateway service that determines a topic of the message and publishes the message using the topic,
   wherein the message is published to an origin server of the content delivery network, and
   wherein the message is consumed from at least one edge server of the content delivery network and published to a second cloud-based IoT gateway service of the IoT gateway moving network, wherein the second cloud-based IoT gateway service publishes the message as an additional radio signal using the topic to at least one additional mobile sensor device within a range of the second cloud-based IoT gateway service for receiving radio signals.

2. The method of claim 1, wherein the obtained radio signal comprises a distress signal of a given mobile sensor device and a location of the given mobile sensor device, and wherein the method further comprises:
   determining, using a K-Nearest Neighbor process, one or more mobile sensor devices in proximity to the given mobile sensor device using the location of the given mobile sensor device and publishing identifiers of the one or more mobile sensor devices in proximity to the given mobile sensor device to the origin server of the content delivery network.

3. The method of claim 1, wherein the first mobile sensor device and the at least one additional mobile sensor device are in different cloud regions.

4. The method of claim 1, wherein the machine-to-machine IoT connectivity protocol comprises a Message Queuing Telemetry Transport (MQTT) protocol.

5. The method of claim 1, wherein the message broker, the first mobile sensor device and the at least one additional mobile sensor device are implemented using open source technology.

6. The method of claim 1, wherein the first mobile sensor device obtains the radio signal from one or more additional mobile sensor devices by means of vehicle-to-vehicle communications.

7. The method of claim 6, wherein the vehicle-to-vehicle communications are initiated between two or more vehicles when the two or more vehicles have a distance that satisfies a predefined distance criteria.

8. The method of claim 1, wherein one or more of the message publishing and the message consumption are performed by at least one publisher/subscriber service.

9. A system, comprising:
   a memory; and
   at least one processing device, coupled to the memory, operative to implement the following steps:
   obtaining, by a first cloud-based IoT gateway service of an IoT gateway moving network, a radio signal from a first mobile sensor device, wherein the IoT gateway moving network comprises a plurality of cloud-based IoT gateway services that communicate with a content delivery network;
   converting, using the at least one processing device, the radio signal to a message in a machine-to-machine IoT connectivity protocol; and
   providing, using the at least one processing device, the message to a message broker of the first cloud-based IoT gateway service that determines a topic of the message and publishes the message using the topic,
   wherein the message is published to an origin server of the content delivery network, and
   wherein the message is consumed from at least one edge server of the content delivery network and published to a second cloud-based IoT gateway service of the IoT gateway moving network, wherein the second cloud-based IoT gateway service publishes the message as an additional radio signal using the topic to at least one additional mobile sensor device within a range of the second cloud-based IoT gateway service for receiving radio signals.

10. The system of claim 9, wherein the obtained radio signal comprises a distress signal of a given mobile sensor device and a location of the given mobile sensor device and further comprising the steps of determining, using a K-Nearest Neighbor process, one or more mobile sensor devices in proximity to the given mobile sensor device using the location of the given mobile sensor device and publishing identifiers of the one or more mobile sensor devices in proximity to the given mobile sensor device to the origin server of the content delivery network.

11. The system of claim 9, wherein the first mobile sensor device and the at least one additional mobile sensor device are in different cloud regions.

12. The system of claim 9, wherein the machine-to-machine IoT connectivity protocol comprises a Message Queuing Telemetry Transport (MATT) protocol.

13. The system of claim 9, wherein the message broker, the first mobile sensor device and the at least one additional mobile sensor device are implemented using open source technology.

14. The system of claim 9, wherein the first mobile sensor device obtains the radio signal from one or more additional mobile sensor devices by means of vehicle-to-vehicle communications.

15. A computer program product, comprising a non-transitory machine-readable storage medium having encoded therein executable code of one or more software programs, wherein the one or more software programs when executed by at least one processing device perform the following steps:

obtaining, by a first cloud-based IoT gateway service of an IoT gateway moving network, a radio signal from a first mobile sensor device, wherein the IoT gateway moving network comprises a plurality of cloud-based IoT gateway services that communicate with a content delivery network;

converting, using the at least one processing device, the radio signal to a message in a machine-to-machine IoT connectivity protocol; and     providing, using the at least one processing device, the message to a message broker of the first cloud-based IoT gateway service that determines a topic of the message and publishes the message using the topic,     wherein the message is published to an origin server of the content delivery network, and     wherein the message is consumed from at least one edge server of the content delivery network and published to a second cloud-based IoT gateway service of the IoT gateway moving network, wherein the second cloud-based IoT gateway service publishes the message as an additional radio signal using the topic to at least one additional mobile sensor device within a range of the second cloud-based IoT gateway service for receiving radio signals.

16. The computer program product of claim 15, wherein the obtained radio signal comprises a distress signal of a given mobile sensor device and a location of the given mobile sensor device and further comprising the steps of determining, using a K-Nearest Neighbor process, one or more mobile sensor devices in proximity to the given mobile sensor device using the location of the given mobile sensor device and publishing identifiers of the one or more mobile sensor devices in proximity to the given mobile sensor device to the origin server of the content delivery network.

17. The computer program product of claim 15, wherein the first mobile sensor device and the at least one additional mobile sensor device are in different cloud regions.

18. The computer program product of claim 15, wherein the machine-to-machine IoT connectivity protocol comprises a Message Queuing Telemetry Transport (MQTT) protocol.

19. The computer program product of claim 15, wherein the first mobile sensor device obtains the radio signal from one or more additional mobile sensor devices by means of vehicle-to-vehicle communications.

20. The method of claim 1, wherein the additional radio signal is communicated at least in part via one or more hops between a plurality of vehicles using vehicle-to-vehicle communications.

\* \* \* \* \*

UNITED STATES PATENT AND TRADEMARK OFFICE
CERTIFICATE OF CORRECTION

PATENT NO. : 10,715,640 B2  
APPLICATION NO. : 16/034427  
DATED : July 14, 2020  
INVENTOR(S) : Sathish K. Bikumala et al.

Page 1 of 1

It is certified that error appears in the above-identified patent and that said Letters Patent is hereby corrected as shown below:

In the Claims

Column 10, Lines 55-56, in Claim 12, replace "Message Queuing Telemetry Transport (MATT) protocol" with -- Message Queuing Telemetry Transport (MQTT) protocol --

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*